United States Patent [19]

Fismer

[11] 4,229,304
[45] Oct. 21, 1980

[54] MOLDED THERMOPLASTIC FILTER PLATE

[75] Inventor: William L. Fismer, Verona, N.J.

[73] Assignee: Envirotech Corporation, Menlo Park, Calif.

[21] Appl. No.: 77,865

[22] Filed: Sep. 21, 1979

[51] Int. Cl.³ .................................................. B01A 25/12
[52] U.S. Cl. ....................................... 210/231; 210/486
[58] Field of Search ................................. 210/231, 486

[56] References Cited

U.S. PATENT DOCUMENTS

| | | | |
|---|---|---|---|
| 3,669,267 | 6/1972 | Hutton | 210/231 |
| 3,931,014 | 1/1976 | Haimbach | 210/231 |
| 4,045,350 | 8/1977 | Kuaf | 210/486 |

FOREIGN PATENT DOCUMENTS 998421   7/1965   United Kingdom ..................... 210/231

Primary Examiner—John Adee
Attorney, Agent, or Firm—Michael J. Pollock

[57] ABSTRACT

A molded thermoplastic filter plate (10, 50) having a peripheral rim (14, 54) which extends completely around the perimeter of and is integral with an inner web (12, 52) such that inner drainage faces (15, 53) are formed on each side of the plate (10, 50). Each side of the plate (10, 50) is divided into four triangular sectors (20, 22, 24, 26 and 60, 62, 64, 66). The boundary of each sector lies generally along a line extending from the center of the drainage face (15, 53) to a corner of the peripheral rim (14, 54), from the corner of the peripheral rim (14, 54) to an adjacent corner of the peripheral rim (14, 54), and from the adjacent corner back to the center of the drainage face (15, 53). Thus, each sector includes a corresponding side of the peripheral rim (14, 54). A plurality of drainage ribs (28, 68) are molded on the drainage face (15, 53) in each sector such that the ribs (28, 68) of a particular sector are parallel to the corresponding side of the peripheral rim (14, 54) in that particular sector.

12 Claims, 7 Drawing Figures

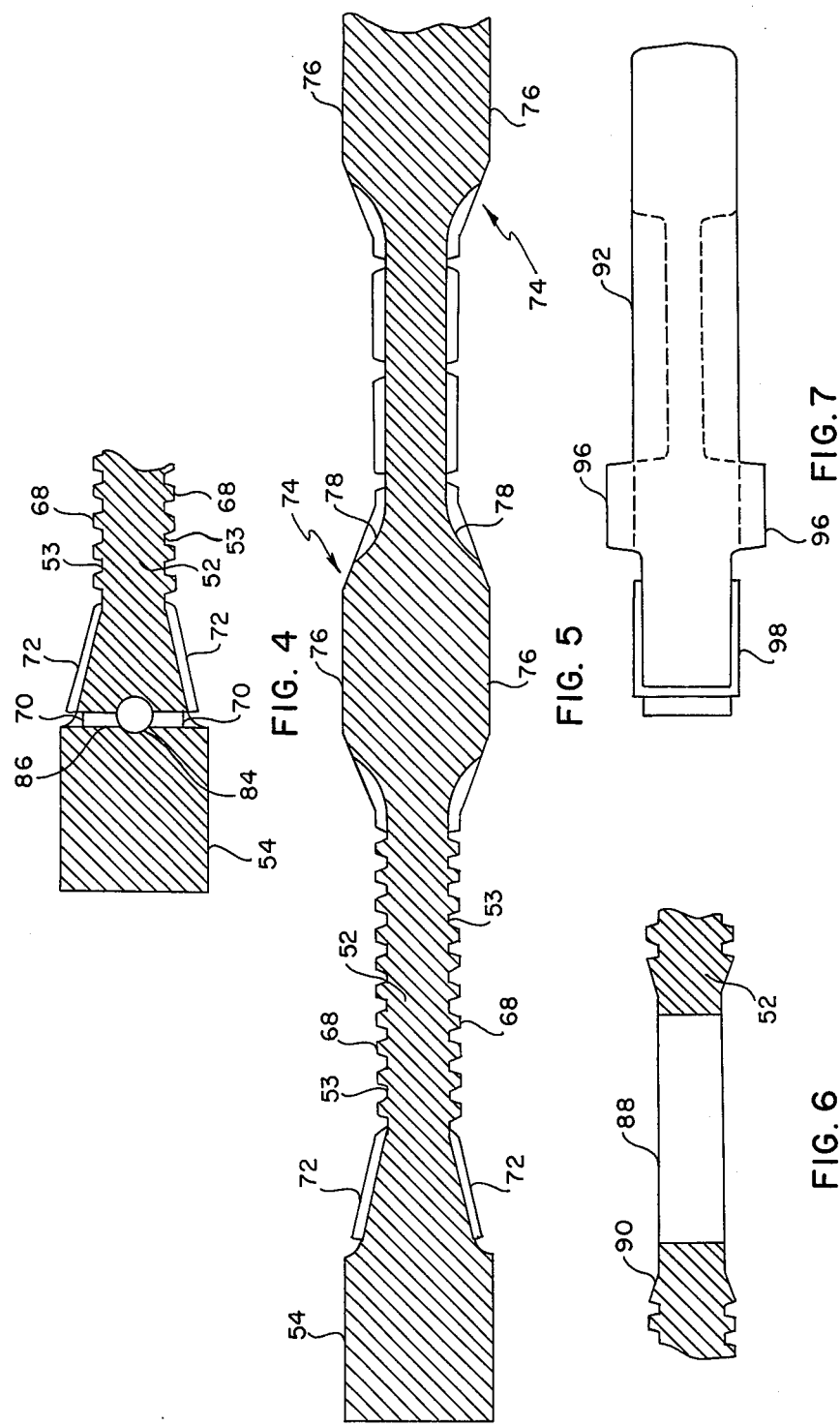

MOLDED THERMOPLASTIC FILTER PLATE

BACKGROUND OF THE INVENTION

1. Field of the Invention

The present invention relates generally to a filter plate of the type utilized in a filter press for separating solids from liquids and particularly to a molded thermoplastic filter plate.

2. State of the Art

Filter presses are well known for separating solids from liquid slurries and the like. Conventional filter presses typically include a series of parallel, vertically disposed filter plates which are supported on a frame. Each filter plate is covered on both of its sides with a filtration medium or cloth which permits liquid to flow therethrough but which prevents the flow of solids contained in the liquid.

One type of filter plate utilized in such filter presses has a peripheral rim which extends completely around the perimeter of a recessed inner web such that inner recessed drainage faces are formed on both sides of the inner web. Thus, when adjacent filter plates are brought together in abutting relationship, the rims of adjacent filter plates engage. The filtration medium between the abutting adjacent plates serves as a gasket to form a liquid-tight seal around feed chambers formed between the recessed inner drainage faces of the adjacent plates.

For filtration, the individual filter plates of the filter press are brought together in abutting, sealing relationship by a closing device, typically a hydraulic ram. The liquid slurry or the like from which solids are to be removed is then fed under pressure into the chambers between adjacent plates. The pressure of the feed slurry forces the liquid to flow from the feed chambers through the filtration medium to the inner drainage faces of the plates. The solids in the slurry are left behind in the chambers between the plates. Filtration proceeds until the chambers are filled with filter cake or until a predetermined terminal pressure is reached. The filtration cycle is then complete; the feed to the press is stopped, the filter plates are moved apart and the filter cake is removed from the press.

In the past, filter plates of the type described above have been molded from thermoplastic materials such as, for example, polypropylene. Typically, such polypropylene plates have raised drainage ribs molded on the inner recessed drainage faces of the plate. These raised drainage ribs serve to hold the filtration medium or cloth above the surface of the inner drainage face so that filtered liquid or filtrate which has passed through the filtration medium can flow along the surface of the inner drainage face to filtrate discharge holes formed in the rim of the plate. Molded thermoplastic filter plates found in the prior art utilize drainage ribs which are formed primarily in a single direction across the inner drainage face of the plate. It has been found that molded filter plates having this type of unidirectional rib structure shrink in the direction of the ribs while the filter plate is setting up in the mold. This shrinkage creates high stress areas over the surface of the filter plate and, thus, reduces its strength.

SUMMARY OF THE INVENTION

A primary object and advantage of the present invention is the provision of a molded thermoplastic filter plate which uniformly distributes across the surface of the plate the stresses caused by contraction of the plate during the molding procedure.

The present invention achieves the foregoing by providing a generally rectangular molded thermoplastic filter plate having a peripheral rim which extends completely around the perimeter of and is integral with an inner web such that inner drainage faces are formed on both sides of the filter plate. Each side of the filter plate is divided into four triangular sectors. The boundary of each sector lies generally along a line extending from the center of the drainage face to a corner of the peripheral rim, from the corner of the peripheral rim along the outer edge of the peripheral rim to an adjacent corner of the peripheral rim, and from the adjacent corner back to the center of the inner drainage face such that each sector includes a corresponding side of the peripheral rim. Each sector has molded thereon drainage ribs which are parallel to the corresponding side of the peripheral rim of the filter plate in that particular sector.

Forming the drainage ribs in this manner, that is, parallel to the corresponding side of the peripheral rim of the plate, distributes the induced molding stresses resulting from the high coefficient of linear contraction of thermoplastic materials uniformly across the entire surface of each side of the filter plate, both vertifcally and horizontally, such that the stresses are minimized and become negligible.

A further understanding of the present invention will be gained by reference to the following description of a preferred embodiment and to the appended drawings, which are offered by way of illustration only and not in limitation of the invention, the scope of which is defined by the appended claims and equivalents to the structure, materials and facts recited therein.

BRIEF DESCRIPTION OF THE DRAWINGS

FIG. 4 is a partial sectional view of the filter plate shown in FIG. 3 taken along line 4—4 of FIG. 3;

FIG. 5 is a partial sectional view of the filter plate shown in FIG. 3 taken along line 5—5 of FIG. 3;

FIG. 6 is a partial sectional view of the filter plate shown in FIG. 3 taken along line 6—6 of FIG. 3;

FIG. 7 is a side detail view of handle 92.

DETAILED DESCRIPTION OF A PREFERRED EMBODIMENT

Figure 2:
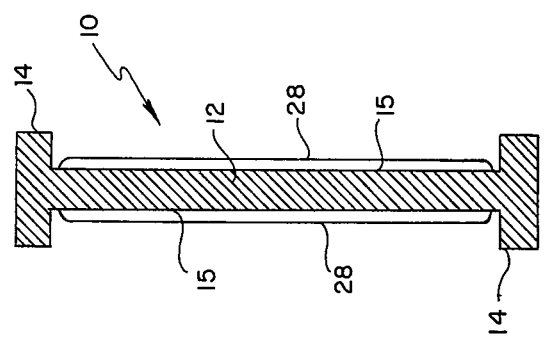
FIG. 2 is a sectional view of the filter plate shown in FIG. 1 taken along line 2—2 of FIG. 1.
Figure 1:
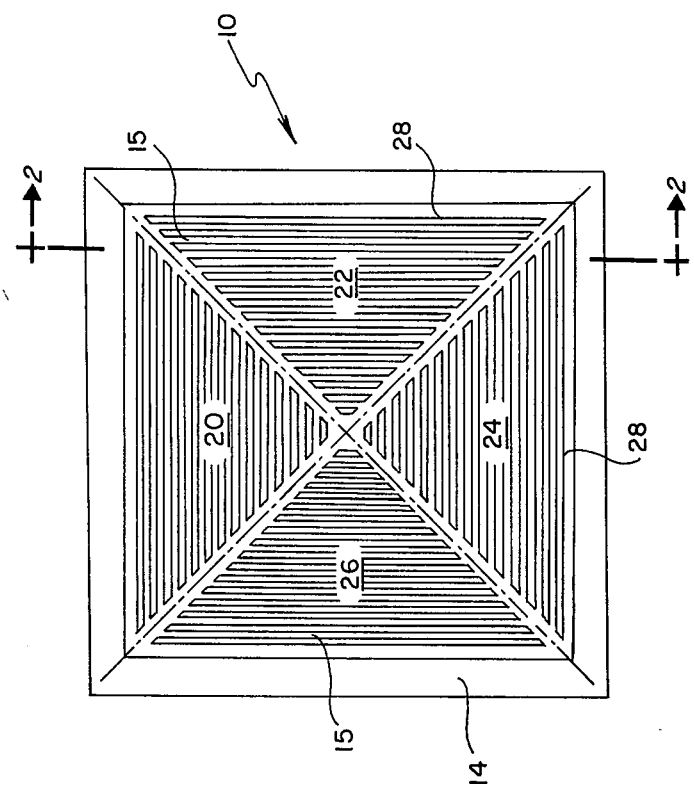
FIG. 1 illustrates a filter plate according to the present invention.

FIGS. 1 and 2 illustrate a generally rectangular filter plate 10 which includes a peripheral rim 14 which extends completely around the perimeter of inner web 12 and is integral therewith. While the invention described herein is applicable to all types of thermoplastic filter plates, the filter plate illustrated in FIGS. 1 and 2 is of the "recessed" type wherein the inner web 12 is recessed from the peripheral rim 14 such that inner recessed drainage faces 15 are formed on both sides of the plate. As shown in FIG. 1, each side of the filter plate 10 is divided into four triangular sectors 20, 22, 24 and 26. The boundary of each sector lies generally along a line extending from the center of the inner drainage face 15 to a corner of the peripheral rim 14, from the corner of the peripheral rim 14 along the outer edge of the peripheral rim to an adjacent corner of the peripheral rim, and back to the center of the inner drainage face.

According to the present invention, a plurality of raised drainage ribs 28 are molded on the drainage face 15 in each of the sectors 20, 22, 24 and 26 such that a majority of the ribs 28 formed in a particular sector are parallel to the corresponding side of the peripheral rim 14 of the filter plate 10 located in that particular sector.

As shown in FIG. 2, the peripheral rim 14 extends above the plane of the inner web 12 on both sides of the filter plate 10 such that when adjacent filter plates of the filter press are brought together in abutting relationship, the rims 14 of adjacent filter plates engage. A filtration medium or cloth disposed between adjacent plates acts as a gasket to form a liquid tight seal around feed chambers formed between the recessed inner drainage faces 15 of adjacent filter plates.

Figure 3:
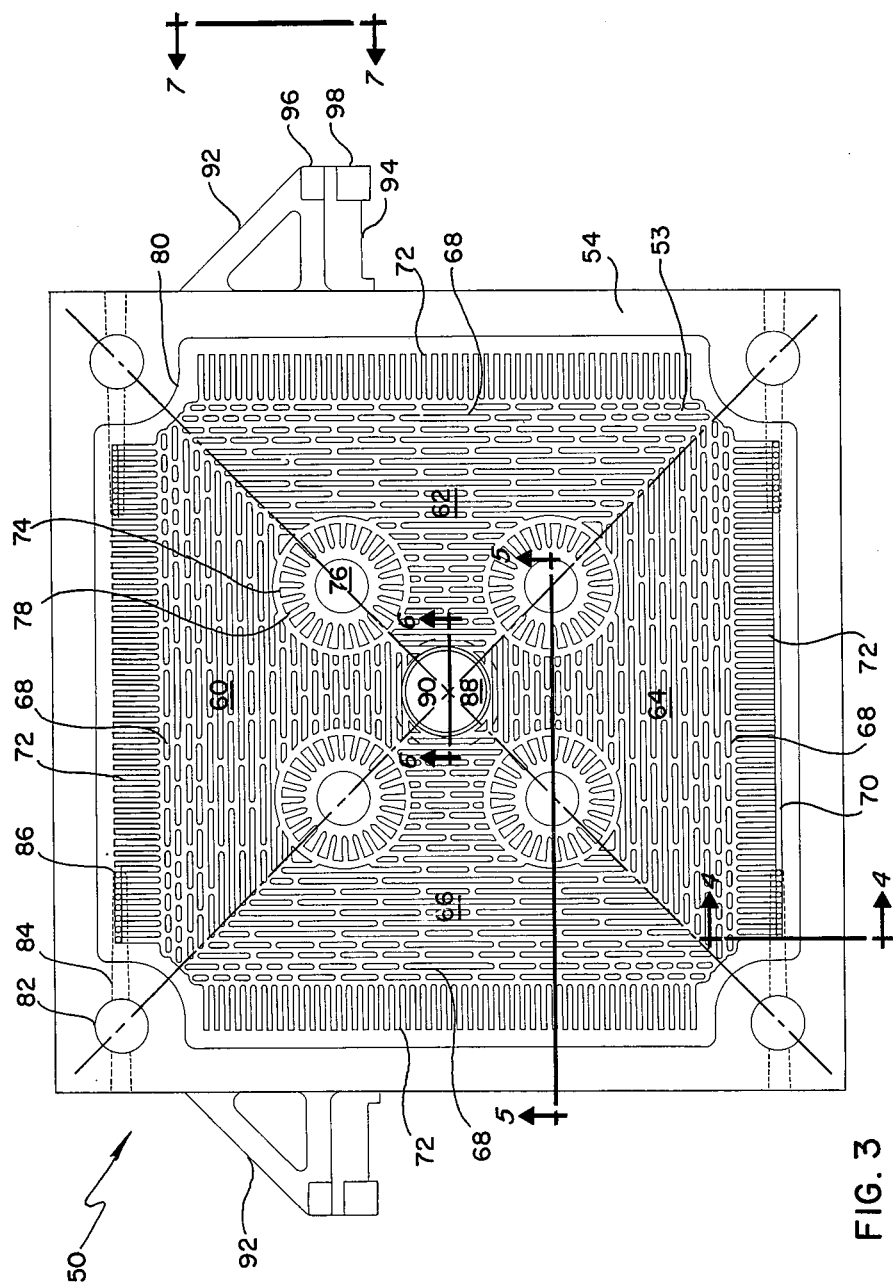
FIG. 3 illustrates a preferred embodiment of the filter plate according to the present invention.

FIG. 3 illustrates a preferred embodiment of the filter plate according to the present invention. In FIG. 3, a square polypropylene filter plate 50 includes a peripheral rim 54 which extends completely around the perimeter of a recessed inner web 52 and is integral therewith so that inner recessed drainage faces 53 are formed on both sides of the plate. Each side of the filter plate 50 is divided into four triangular sections 60, 62, 64 and 66. The boundary of each sector lies generally along a line extending from the center of the inner drainage face 53 to a corner of the peripheral rim 54 of the plate, from the corner of the peripheral rim along the outer edge of the peripheral rim to an adjacent corner, and from the adjacent corner back to the center of the plate such that each sector includes a corresponding side of the peripheral rim 54.

A plurality of discontinuous raised drainage ribs 68 are molded on the drainage face 53 in each of the sectors 60, 62, 64 and 66 such that a majority of the drainage ribs 68 formed in a particular sector are parallel to the corresponding side of the peripheral rim 54 of the filter plate 50 located in that particular sector. Forming the raised drainage ribs 68 in this manner, that is parallel to the corresponding sides of the peripheral rim 54, minimizes the induced molding stresses due to the high coefficient of linear contraction of thermoplastic materials and, thus, minimizes the stresses incurred by the filter plate during molding.

As shown in FIG. 4, the peripheral rim 54 extends above the plane of the inner web 52 on both sides of the filter plate 50 such that when adjacent filter plates of the filter press are brought together in abutting relationship, the rims 54 of adjacent filter plates engage. A filtration medium or cloth disposed between adjacent plates acts as a gasket to form a liquid-tight seal around feed chambers formed between the recessed inner drainage faces 53 of the adjacent plates.

Returning to FIG. 3, the adjacent sides of the peripheral rim 54 meet in inwardly rounded corners to form a rounded discharge section 80 at each corner of the peripheral rim 54. Formed, and preferably molded, in each of the sections 80, is a discharge eye 82 which, as explained below, removes filtered liquid from the filter press. Formed, and preferably molded, in the sides of the plate 50 to extend into the inner web 52 in flow communication with the discharge eyes 82 are generally cylindrical, horizontal drainage ports 84 which carry filtrate from the drainage face 53 to the discharge eye 82. A number of port holes 86 provide flow communication between the drainage face 53 of the filter plate 50 and the drainage port 84. The drainage port 84 and port holes 86 of one corner of the filter plate 50 are shown in cross-section in FIG. 4. Preferably, a drainage port 84 and port holes 86 are formed at each corner of the filter plate as shown in FIG. 3.

As further shown in FIG. 4, the inner web 52 is slightly bevelled at its edges so as to slope toward and become integral with the peripheral rim 54. This gradual increase in thickness toward the peripheral rim 14 serves to further minimize shrinking of the plate during molding. Formed on the bevelled portion of the inner web 52 normal to the corresponding side of the peripheral rim 54 in that particular sector of the filter plate are a series of discharge ribs 72. As best shown in FIG. 3, the discharge ribs 72 channel filtrate from the inner drainage face 53 to the discharge eye 82.

To further assist in channelling filtrate from the inner drainage face 53 to the discharge eye 82, a horizontal bottom drainage groove 70 is formed along the bevelled portion of the inner web 52 at its bottom on both sides of the filter plate 50. Preferably the port holes 86 are formed within the groove 70, as shown in FIG. 4.

Molded on each of the drainage faces 53 of the filter plate 50 are a number of staybosses 74. As shown in FIG. 5, the staybosses 74 are frusto-conical with flat tops 56 which are raised from the inner web 52 of the filter plate 50 to the same extent as is the peripheral rim 54. Each stayboss 74 has a number of drainage slots 78 formed around its circumference. In the embodiment illustrated in FIG. 3, four staybosses 74 are located on the inner web 52 of the filter plate 50 equidistant from the center of the inner web 52.

As shown in FIG. 6, a feed opening 88 is formed in the inner web 52 of the filter plate 50, preferably at its center, for introducing feed liquid to the feed chambers formed between adjacent filter plates when the plates are brought together in abutting relationship. Surrounding the feed opening 88 is a bevelled feed opening surface 90.

Referring again to FIG. 3, thermoplastic, preferably polypropylene, handles 92 are attached, and preferably integrally molded, to both vertical sides of the peripheral rim 54 of the filter plate 50. A groove 94 is formed at the bottom of each handle 92 allowing the filter plate 50 to be suspended from the frame of the filter press for sliding movement. As shown in FIG. 7, each of the handles 92 includes stops 96 which provide a thickness to the handle which is substantially the same as the width of the peripheral rim 54. Thus, the stops 96 absorb shocks imparted to the handles 92 by plate shifting mechanisms typically used on filter presses. Each handle 92 further includes a U-shaped metal pad 98 which reduces the amount of wear to the handle caused by such plate shifting mechanisms.

Utilization of the filter plate according to the present invention may now be readily understood.

During filtration, adjacent filter plates 50 of the filter press are brought together in abutting relationship such that the rims 54 of adjacent filter plates 50 engage and, with the filtration medium between the plates acting as a gasket, form a liquid-tight seal around the recessed inner drainage faces 53 of the plates and, thus, form a slurry feed chamber between the adjacent inner drainage faces. The feed openings 88 of the abutting adjacent plates 50 form a feed channel through which liquid slurry to be filtered is introduced under pressure to the slurry feed chambers. Because the raised drainage ribs 68 hold the filtration medium above the surface of the drainage face 53, a filtrate space is formed between the medium and the drainage face 53. The pressure differential between the slurry feed chamber and the filtrate space causes liquid to flow from the feed chamber, through the filtration medium, and to the filtration space. Liquid passing through the filtration medium is directed along the drainage face 53 toward port holes 86 by the ribs 68. Thus, filtered liquid flows into port holes 86, through drainage ports 84 and into discharge eyes 82 from which it is ultimately discharged from the filter press.

I claim:

1. A generally rectangular molded thermoplastic filter plate for use in a filter press of the type used for separating solids from a liquid wherein a plurality of filter plates are brought together in abutting relationship and filtration is accomplished by passing a liquid through filter cloths disposed between adjacent filter plates, comprising:
   a. a peripheral rim extending completely around the perimeter of and integral with an inner web such that an inner drainage face is formed on each side of said filter plate, each side of said filter plate being divided into four triangular sectors, the boundary of each sector lying generally along a line extending from the center of said inner drainage face to a corner of said peripheral rim of said filter plate, from said corner along the outer edge of said peripheral rim to an adjacent corner of said peripheral rim, and from said adjacent corner back to the center of said inner drainage face such that each of said sectors includes a corresponding side of said peripheral rim; and
   b. a plurality of drainage ribs molded on said inner drainage face in each of said sectors such that a majority of said ribs of a particular sector are parallel to the corresponding side of said peripheral rim in that particular sector.

2. A generally square molded polypropylene recessed filter plate for use in a filter press of the type used for separating solids from a liquid wherein a plurality of filter plates are brought together in abutting relationship and filtration is accomplished by passing a liquid through filter cloths disposed between adjacent filter plates, comprising:
   a. a peripheral rim extending completely about the perimeter of and integral with a recessed inner web such that inner recessed drainage faces are formed on each side of said filter plate, each side of said filter plate being divided into four triangular sectors, the boundary of each sector lying generally along a line extending from the center of said inner drainage face to a corner of said peripheral rim of said filter plate, from said corner along the outer edge of said peripheral rim to an adjacent corner of said peripheral rim and from said adjacent corner back to the center of said inner drainage face such that each of said sectors includes a corresponding side of said peripheral rim; and
   b. a plurality of discontinuous raised drainage ribs molded on said inner drainage face in each of said sectors of said filter plate such that a majority of said ribs of a particular sector are parallel to the corresponding side of said peripheral rim in that particular sector.

3. The filter plate of claim 1 wherein said inner web is bevelled at its edges to slope toward and become integral with said peripheral rim.

4. A filter plate according to claim 3 further including raised discharge ribs formed on said bevelled edges of said inner web, said discharge ribs in a particular sector being normal to the corresponding side of the peripheral rim in that particular sector.

5. A filter plate according to claim 4 further including a horizontal drainage groove formed along the bevelled edge of said inner web on both sides of the bottom edge of said inner web, said groove formed between said plurality of discharge ribs and the bottom side of said peripheral rim.

6. The filter plate of claim 5 wherein adjacent sides of said peripheral rim meet in inwardly rounded corners, each of said corners having a discharge eye molded therein.

7. A filter plate according to claim 6 further including a generally cylindrical, horizontal drainage port molded in the bevelled edge of said inner web at each of the corners of said filter plate, said drainage port of a particular corner being in flow communication with said discharge eye of that particular corner.

8. A filter plate according to claim 7 further including port holes formed in said horizontal drainage groove, said port holes extending from said inner drainage face to said drainage ports to provide flow communication therebetween.

9. A filter plate according to claim 2 further including a plurality of frusto-conical staybosses molded on said inner drainage faces, each of said staybosses having drainage slots formed about its circumference.

10. A filter plate according to claim 2 further including a polypropylene handle molded to each of the vertical sides of said peripheral rim.

11. The filter plate of claim 10 wherein each of said handles has stops formed thereon, said stops providing a thickness to said handle which is substantially the same as the width of said peripheral rim so that shocks imparted to said handles by filter plate shifting mechanisms are absorbed by said stops.

12. The filter plate of claim 11 wherein each of said handles has a metal pad attached thereto for reducing the amount of wear to said handle caused by filter plate shifting mechanisms.

* * * * *